Patented Aug. 21, 1951

2,564,967

UNITED STATES PATENT OFFICE 2,564,967

METHOD FOR PRODUCING SUBSTITUTED NAPHTHOQUINONES

Louis F. Fieser, Cambridge, Mass., assignor to Research Corporation, New York, N. Y., a corporation of New York No Drawing. Application February 2, 1950, Serial No. 142,088

6 Claims. (Cl. 260—396)

This invention relates to a method of producing naphthoquinone intermediates and is particularly directed to an improved method for the conversion of 1-napthols containing an alkyl or substituted alkyl group in the 2-position to the corresponding 1,4-naphthoquinones.

An important step in the process described by George Fawaz in application Serial No. 140,350, filed January 24, 1950, for preparation of ethyl ω-(1,4-naphthoquinonyl-2)-decanoate, an intermediate to the anti-malarial lapinone, consists in oxidation of ethyl ω-(1-hydroxy-2-naphthyl)-decanoate. In the procedure described by Fawaz (Example 2) oxidation is conducted by addition of a solution of chromic anhydride in a mixture of equal parts of acetic acid and water to a solution of the 2-substituted-1-naphthol in acetic acid with very careful control of the temperature for a period of five and one-half hours. Under these optimum conditions the yield of satisfactory quinone is only 32 g. from 100 g. of 2-sebacoyl-1-naphthol, or 29.5% for the two steps of Clemmensen reduction and oxidation. Hence this is a weak point in an otherwise efficient series of synthetic operations.

I have now found that this sensitive process of oxidation can be conducted with greatly improved results by omitting the addition of water in the preparation of the oxidation mixture. When the above-mentioned ester is oxidized by this anhydrous procedure, pure ethyl ω-(1,4-naphthoquinonyl-2)-decanoate is easily obtained in greatly improved yield. A further important advantage is that the order of addition is not a critical factor, for excellent results are obtained either by adding the chromic anhydride to a solution of the naphthol or by adding a solution of the naphthol to a suspension of chromic anhydride in acetic acid. Thus yields of 40–50% are realized in the oxidation step, whereas the Fawaz procedure gives at most an overall yield of 29.5% for the two steps of reduction and oxidation.

The new method of oxidation under anhydrous conditions is applicable also to 1-naphthols substituted in the 2-position by alkyl groups, for example n-alkyl groups and cycloalkylalkyl groups. The limitations inherent in the classical process of oxidation with a solution prepared by addition of a certain amount of water vanish when the addition of water is omitted.

EXAMPLE 1

*Ethyl ω-(1,4-naphthoquinonyl-2)-decanoate*

A solution of 100 g. of ethyl ω-(1-hydroxy-2-naphthyl)-decanoate (M. P. 44–46° C.) prepared as described by Fawaz (Example 2) in 1 l. of glacial acetic acid is stirred mechanically at 30° C. and 83 g. of anhydrous chromic anhydride is added in four portions at intervals of ten minutes. During the addition the temperature of the stirred mixture is carefully controlled to 31–32° C. by cooling, as required. The mixture is stirred further until the temperature begins to drop below 30° C., which takes thirty to forty minutes. One liter of lukewarm water (about 30° C.) is added and the solution is cooled at 5° C. overnight. The quinone that separates is washed with 50 cc. of a mixture of equal volumes of acetic acid and water and crystallized by dissolving it in 300 cc. of acetic acid, filtering the solution, and adding water to the point of turbidity (about 60 cc.). The yield of pure yellow ethyl ω-(1,4-naphthoquinonyl-2)-decanoate of satisfactory quality, M. P. 72–74° C., is 43 g. (41%).

EXAMPLE 2

*Ethyl ω-(1,4-naphthoquinonyl-2)-decanoate*

A suspension of 83 g. of chromic anhydride in 500 cc. of glacial acetic acid is stirred mechanically at 31–32° C. and a solution of 100 g. of ethyl ω-(1-hydroxy-2-naphthyl)-decanoate (M. P. 44–46° C.) in 500 cc. of glacial acetic acid is run in in the course of twenty minutes, with control of the temperature to 31–32° C. The mixture is stirred for forty minutes longer and diluted with 1 l. of lukewarm water and cooled at 5° C. overnight. The yellow quinone that separates is crystallized by the method described in Example 1. The yield of satisfactory material, M. P. 72–74° C., in the first crop is 52 g. (50%).

EXAMPLE 3

*2-octadecyl-1,4-naphthoquinone*

A mixture of 4.7 of 2-octadecyl-1-naphthol (Fawaz, Example 15) and 125 cc. of glacial acetic acid is stirred at 65° C. until a fine suspension of oil results and the temperature is lowered to 30° C. with continued stirring to give a suspension of finely divided solid. The stirred suspension is maintained at 30° C. while 15 g. of chromic anhydride is added in portions in thirty minutes. After a total of two hours, 350 cc. of water is added and the precipitated yellow quinone is collected and washed. The yield of satisfactory 2-octadecyl-1,4-naphthoquinone is 2.7 g. (55%). Crystallization from acetone gives yellow rods, M. P. 82.5–82.9° C.

Hydroxylation through the oxide (M. P. 91.8–

92.3° C.) gives 2-hydroxy-3-octadecyl-1,4-naphthoquinone, M. P. 99.5–100.6° C.

EXAMPLE 4

2-(ω-cyclohexybutyl)-1,4-naphthoquinone

Thirty grams of chromic anhydride is added in the course of one-half hour to a solution in 500 cc. of glacial acetic acid of the oily 2-(ω-cyclohexylbutyl)-1-naphthol resulting from Clemmensen reduction of 29.5 g. of 2-(γ-cyclohexylbutyryl)-1-naphthol. The temperature is maintained at 28–31° C. during the addition by intermittent cooling, as required. After the addition the solution is stirred for one-half hour longer at room temperature and then 500 cc. of water is added and the solution let stand overnight in the cold room. The yellow solid that separates is crystallized from methanol-ethanol and affords 13 g. of light yellow 2-(ω-cyclohexylbutyl)-1,4-naphthoquinone, M. P. 74–75° C. The overall yield in two steps is 44%.

EXAMPLE 5

2-n-tetradecyl-1,4-naphthoquinone

The nearly colorless crystalline 2-n-tetradecyl-1-naphthol resulting from Clemmensen reduction of 4.7 g. of 2-myristoyl-1-naphthol is dissolved in 100 cc. of glacial acetic acid and the solution is filtered and added dropwise to a vigorously stirred suspension of 4.1 g. of chromic anhydride in 25 cc. of glacial acetic acid. The temperature is kept at 31–32° C. and the addition is completed in about twenty minutes. The solution is poured into a beaker and the flask rinsed with 25 cc. of glacial acetic acid and the solution diluted with 150 cc. of lukewarm water and let stand in the cold room. The fine, bright yellow crystals that separate are collected, washed, and dissolved in 50 cc. of acetic acid. The filtered solution is treated with 2 cc. of water and on cooling deposits 2.0 g. of 2-n-tetradecyl-1,4-naphthoquinone in the form of shiny yellow crystals, M. P. 74–75° C. The overall yield from the ketone is 42.5%.

In general, it is desirable that the amount of chromic anhydride be not greatly in excess of that theoretically required for the desired oxidation. The rate of reaction increases with increasing temperature. In general, the temperature should not be allowed to exceed about 45° C., and a temperature of about 30° C. has been found to particularly be advantageous in giving a reasonably short reaction period with relatively high yields.

I claim:
1. A method for the production of 2-substituted 1,4-naphthoquinones which comprises subjecting a 1-naphthol containing in the 2-position a substituent of the group consisting of alkyl and substituted alkyl groups to the action of chromic anhydride in glacial acetic acid under substantially anhydrous conditions until the 1-naphthol is converted to the corresponding 1,4-naphthoquinone.

2. A method for the production of 2-substituted 1,4-naphthoquinones which comprises subjecting a 1-naphthol containing in the 2-position a substituent of the group consisting of alkyl and substituted alkyl groups to the action of chromic anhydride in glacial acetic acid at about 30° C. under substantially anhydrous conditions until the 1-naphthol is converted to the corresponding 1,4-naphthoquinone.

3. A method for the production of ethyl ω-(1,4-naphthoquinonyl-2)-decanoate which comprises subjecting ethyl ω-(1-hydroxy-2-naphthyl)-decanoate to the action of chromic anhydride in glacial acetic acid under substantially anhydrous conditions and recovering ethyl ω-(1,4-naphthoquinonyl-2)-decanoate from the reaction product.

4. A method for the production of 2-octadecyl-1,4-naphthoquinone which comprises subjecting the 2-octadecyl-1-naphthol to the action of chromic anhydride in glacial acetic acid under substantially anhydrous conditions and recovering 2-octadecyl-1,4-naphthoquinone from the reaction product.

5. A method for the production of 2-(ω-cyclohexylbutyl)-1,4-naphthoquinone which comprises subjecting 2-(ω-cyclohexylbutyl)-1-naphthol to the action of chromic anhydride in glacial acetic acid under substantially anhydrous conditions and recovering 2-octadecyl-1,4-naphthoquinone from the reaction product.

6. A method for the production of 2-n-tetradecyl-1,4-naphthoquinone which comprises subjecting 2-n-tetradecyl-1-naphthol to the action of chromic anhydride in glacial acetic acid under substantially anhydrous conditions and recovering 2-n-tetradecyl-1,4-naphthoquinone from the reaction product.

LOUIS F. FIESER.

REFERENCES CITED

The following references are of record in the file of this patent:

Miller, Berichte 14, 1602 (1881).